July 23, 1935.  A. P. ARMINGTON  2,009,039
LAND VEHICLE
Filed March 26, 1930
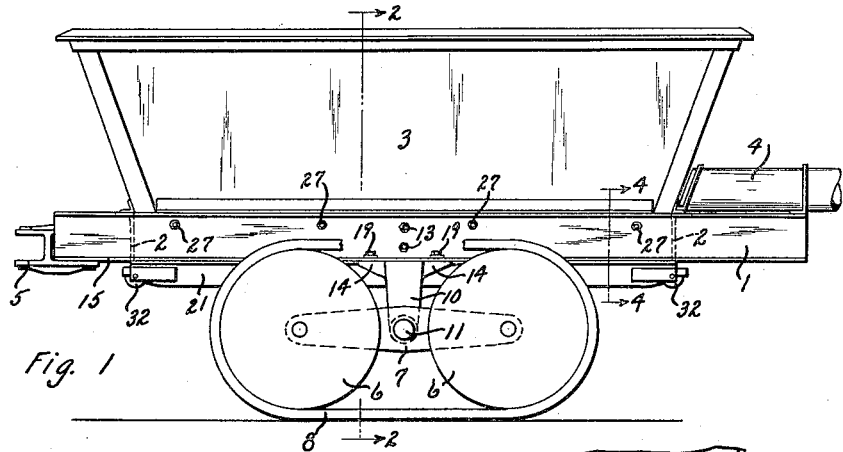
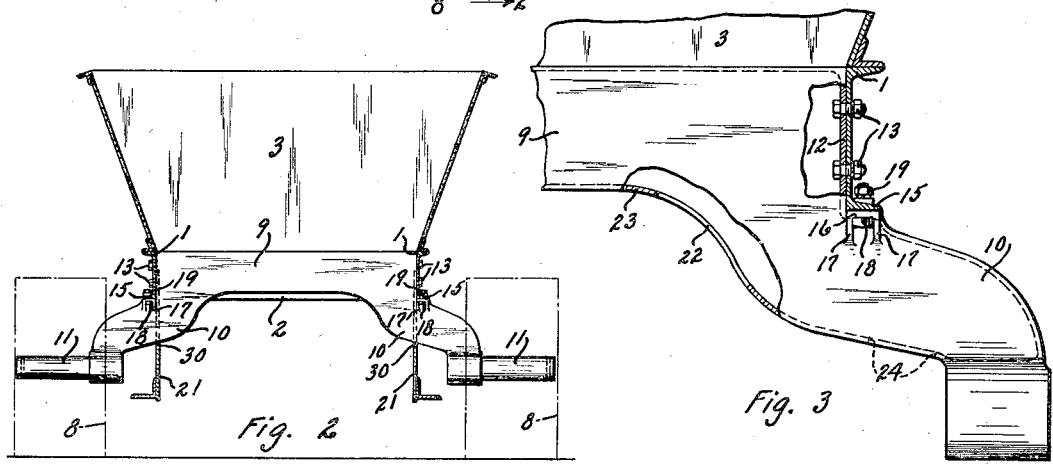
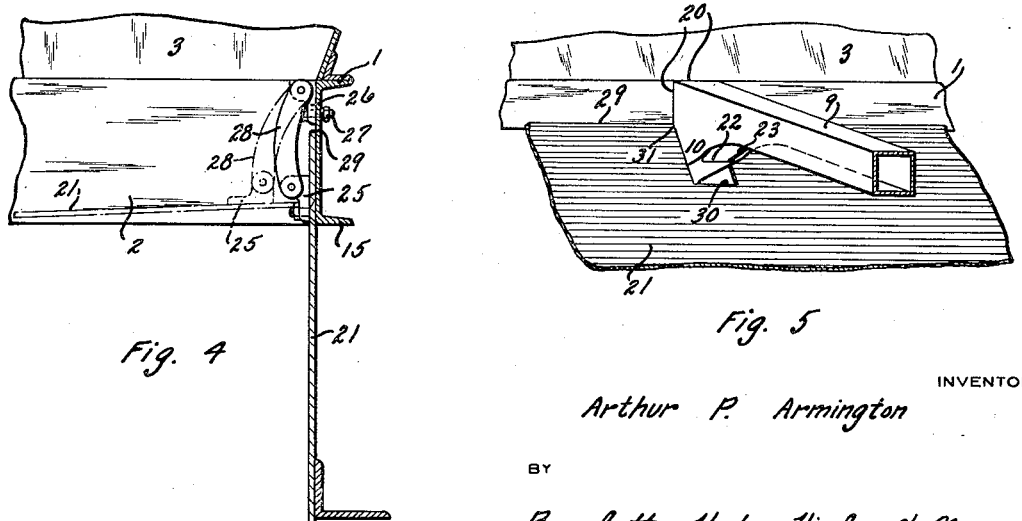
INVENTOR
Arthur P. Armington
BY
Brockett, Hyde, Higley & Meyer
ATTORNEYS Patented July 23, 1935

2,009,039

UNITED STATES PATENT OFFICE 2,009,039

LAND VEHICLE

Arthur P. Armington, Willoughby, Ohio, assignor to The Euclid Crane & Hoist Company, Euclid, Ohio, a corporation of Ohio Application March 26, 1930, Serial No. 439,024

4 Claims. (Cl. 298—35)

This invention relates to heavy-duty bottom-dump trailer-wagons. Such a vehicle comprises as its principal parts so far as we are here concerned, an open-bottom container-body which may preferably comprise a rigid open frame and a hopper carried thereby to dump therethrough, running gear preferably of endless tread type, disposed on either side of the body, arched axle means supporting the body in elevated position upon the running gear, and doors for the dumping opening mounted to swing downwardly and outwardly to depending dumping position.

While each door swings generally about its body side, it preferably does not move about a fixed axis, but is rather so mounted that its relatively fixed edge rises within the dumping opening as the door moves to dump, so that when in dumping position the depending door edge will have more clearance above the ground than would be possible were a fixed axis provided.

Further, in some instances it is preferable that the arched axle comprise a member extending across the body, as between the side frame members, and arms extending downwardly and outwardly of this transverse member, passing beneath the side frame members, and having at their lower ends the usual stub shafts for connection with the running gear.

It is of course desirable in all cases that the doors be capable of closing the entire dumping opening, and that the doors extend the full length thereof so that a single pair only need be provided, and so that equal dumping fore-and-aft of the axle, with corresponding stability of the wagon, will be insured.

Difficulties not at once apparent arise when it is desired to incorporate such door arrangement with such axle arrangement; and it is generally the object of this invention to provide a construction incorporating such features, in a simple manner, retaining all of the advantages of each.

The exact nature of this invention together with further objects and advantages thereof will be apparent from the following description taken in connection with the accompanying drawing, in which Fig. 1 is a side elevation of such a wagon; Fig. 2 is a typical transverse section of the same as in the plane of line 2—2, Fig. 1; Fig. 3 is a detail of a portion of the axle showing its manner of assembly with the wagon body; Fig. 4 is a detail section as in the plane of line 4—4, Fig. 1 showing the manner of hanging the doors; and Fig. 5 is a perspective detail from the inside of the wagon showing the load-containing cooperation of the body, doors and axle, the shown door appearing in partially opened position.

With reference now to the drawing the container-body of the vehicle shown comprises a rigid open frame, a hopper carried thereby to dump therethrough, and doors for controlling the dumping opening and carried by the side frame members.

The frame side members 1 are of rolled structural steel preferably of standard section such as the channel section shown wherein the flanges are turned outwardly. The side frame members are joined by transverse frame members also preferably of standard rolled section and including a pair of members 2 which with the side frame portions therebetween define the dumping opening. A hopper 3 is mounted on the frame with its lower extremities fitting this dumping opening. The usual draft means including the tongue 4 and rear hitch 5 are associated with the frame.

Running gear of endless tread linkage is provided on either side of the vehicle for supporting its container-body. Such running gear on each side includes as its principal elements paired wheels 6 carried by a rock beam 7 and carrying an endless tread linkage 8; these parts being conventionally indicated Fig. 1, as being well known in the art.

To support the container-body on the running gear an arched axle structure is provided, located intermediate the ends of the body. This arched axle comprises a transverse member 9 extending between the side frame members 1 and thus generally across the dumping opening, and a pair of arms 10 each extending downwardly from the transverse member 9, outwardly beneath its corresponding side frame member 1 and carrying at its lower extremity a stub shaft 11; which stub shaft in turn has bearing in the rock beam 7 of the running gear on its side of the vehicle, all as shown Figs. 1–2 of the drawing.

The axle is preferably of box section, that is, hollow, with the arms and transverse member integral, so that the side and lower walls of the transverse member and arms are generally portions of walls common to these parts.

For securing this arched axle to the side frame members of the body I provide on the transverse member 9 end walls 12 against the side frame members 1; and secure these parts together by bolts 13 extending through suitable aligned openings therein, the bolts being located between the flange portions of the side frame members and passing through the web portions thereof. I also provide upon the axle arm portions 10 brackets 14 extending fore-and-aft thereof and beneath the lower flanges 15 of the side frame members. Each of these brackets has a face portion 16 coextensive with and bearing against its side frame member flange portion, and a pair of web portions 17 spaced to receive therebetween the head 18 of bolt means 19 by which the brackets 14 are secured with the frame flange 15.

It will be apparent that by the provisions described the frame and axle of the vehicle may be assembled to comprise a rigid unit. In order that the assembly of the bolts 13 may be made I provide an opening 22 in the lower wall 23 of the axle and as adjacent as possible to the end wall 12 of the transverse axle member 9; this opening 22 providing a hand hole through which bolts 13 may be inserted. Various other openings such as an opening 24 lower than the opening 22, may be provided in the wall 23 to allow exit of load particles which might accumulate in the axle hollow.

It will also be apparent that each of the four corners 20, at the joinder of the side face of the axle with the adjacent frame side member, is clear and unobstructed through its vertical extent as shown particularly Fig. 5; and that the brackets 14 do not extend beneath the dumping opening.

To control the dumping opening a pair of doors 21 are provided, each mounted for generally swinging movement generally about one of the side frame members. To this end each door is provided with a number of brackets 25, set somewhat within the door edge, and the side frame members 1 are provided adjacent their upper extremities with corresponding brackets 26 secured as by bolts 27; and each pair of brackets 25 and 26 are connected by a link 28. The proportion and arrangement of the parts is such that as indicated Fig. 4 each door may move between closed position, substantially horizontal as shown in broken lines, to the depending dumping position shown in full lines. The near edge 29 of the door at all times bears against the inner face of the corresponding side frame member 1, and moves upwards as the door opens; so that the far extremity of the door moves only approximately upon a 90° arc, rather varying in movement decidedly upwardly of the arc as the door approaches dumping position.

Door movement is controlled by the usual operating gear not shown but including cable means passing over sheaves 32 located at the free corners of the door.

I arrange for the dumping opening a single pair of doors each extending the full length thereof, and in the zone of the axle cut away from each door an opening 30 sufficient to clear the corresponding axle arm portion in the path of door swing, and leaving corner portions 31 extending into the described angles 20 between the axle and the side frame members. In other words I make the doors to fit the axle in this respect, so that the doors may control the dumping opening substantially as well as were no axle arm portions in the general path of door swing.

What I claim is:

1. In a dumping vehicle, a rigid open frame, a hopper carried thereby to dump therethrough, mobile supporting means for said frame including arched axle means arranged intermediate the frame ends, said axle means including a member extending across the frame between side members thereof and arms extending downwardly and outwardly of the ends of said member, each beneath its corresponding side frame member, and having at their lower ends stub shafts for connection with running gear, said transverse axle member being generally rectangular and having end walls against the side frame members and secured thereto, and dumping door means having corner portions extending into and movable along the vertically extending angles between said side frame members and said transverse axle member.

2. In a vehicle of the class described and having a rigid open frame, an open-bottom container carried by said frame to dump therethrough, arched axle means including a transverse member extending across the frame intermediate the ends and between the side members thereof and above the dumping opening and at each end of said transverse member an arm extending downwardly inside the frame and thence outwardly below its corresponding side frame member and carrying a stub shaft for connection with the running gear, a single pair of doors for the dumping opening, each door extending the full length of the opening and mounted therewithin to swing downwardly and outwardly to dumping position and upwardly to closed position beneath said transverse member, and each door being recessed to clear that axle arm portion which would otherwise be in its path of movement.

3. In a vehicle of the class described and having a rigid open frame, an open-bottom container carried by said frame to dump therethrough, arched axle means including a transverse member extending across the frame intermediate the ends and between the side members thereof and above the dumping opening and at each end of said transverse member an arm extending downwardly inside the frame and thence outwardly below its corresponding side frame member and carrying a stub shaft for connection with running gear, a single pair of doors for the dumping opening, each door extending the full length of the opening and mounted therewithin to swing downwardly and outwardly to dumping position and upwardly to closed position beneath said transverse member, and each door being recessed to clear that axle arm portion which would otherwise be in its path of movement, said axle arm portion having curvature generally corresponding to the path of movement of the adjacent door portion.

4. In a vehicle of the class described and having an open-bottom container, a single pair of doors for the dumping opening, one for each side thereof, each door having means mounting it upon its side of the container whereby the inner edge of the door swings downwardly and outwardly to dumping position and upwardly to closed position, each door having a recess at its outer edge portion and being uninterrupted opposite said recess, and arched axle means for said vehicle including a transverse member extending across the container, above and intermediate the ends of the doors, and also including at each end of said transverse member an arm extending downwardly and thence outwardly below its corresponding side of the container and carrying a stub shaft for connection with running gear, the arms of said axle means extending through said recesses of the doors, whereby each door has strength along its swinging edge by the continuity thereof, and is reinforced along its recessed edge by said mounting means.

ARTHUR P. ARMINGTON.